Feb. 3, 1970

MASAMITSU NAKANISHI 3,493,364

METHOD OF MANUFACTURING ALLOY BY USING CONSUMABLE ELECTRODES

Filed May 24, 1966

3,493,364
METHOD OF MANUFACTURING ALLOY BY USING CONSUMABLE ELECTRODES
Masamitsu Nakanishi, 3–502 Omiya Danchi, 1–1 Omiya-machi, Kawasaki-shi, Japan
Filed May 24, 1966, Ser. No. 552,570
Claims priority, application Japan, Mar. 19, 1966, 41/016,983; Apr. 21, 1966, 41/025,367
Int. Cl. C22c 39/54, 9/00
U.S. Cl. 75—12                                    5 Claims

ABSTRACT OF THE DISCLOSURE

An improved method for manufacturing alloy mainly composed of iron and copper wherein composite metallic materials of the alloy are used as consumable electrodes, which are melted by supplying an AC current under comparatively low voltage within a crucible furnace. A molten layer of slag covers the molten alloy for protecting against oxidation thereof due to contact with the atmosphere and also conducts the current. Various combinations of the metallic materials can be obtained by selecting the type and the relative position of the consumable electrodes. The consuming speed of the consumable electrodes can be automatically controlled in accordance with changes in electrical characteristics of a circuit comprising the consumable electrodes.

---

The present invention relates to a method for manufacturing ferroalloys, particularly, to a method for manufacturing alloys composed mainly of iron and copper.

It is said that an economical method for manufacturing ferro-copper alloy on an industrial scale has not been developed and therefore it has been difficult to use ferro-copper alloy for many industrial uses.

The principal object of the present invention is to develop an economical method for manufacturing ferro-cooper alloy on an industrial scale at low cost.

Another object of the invention is to develop a new alloy composed mainly of iron and copper which has superior wear resistance, and heat and electrical conductivity.

Further features and advantages of the invention will be apparent from the ensuing description with reference to the accompanying drawings wherein.

Figure 1:
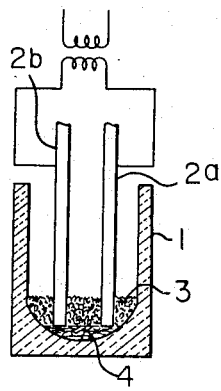
FIGS. 1, 2, 3 and 4 are cross-sectional views showing an embodiment of the method for manufacturing an alloy according to the present invention.
Figure 2:
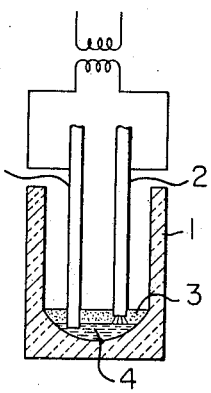

As a method for manufacturing an alloy, the method of arc melting is known. In such a method of arc melting, metallic materials for manufacturing an alloy are used as the negative electrode, a crucible furnace made of copper having a water-cooling system is used as the positive electrode, and the metallic materials of the negative electrode are melted in a vacuum for producing a manufacturing alloy. According to the above-mentioned melting method, only metallic materials for manufacturing alloys with simple compositions can be melted. In the case of a manufacturing alloy having multiple composition, it is difficult to produce an alloy having uniform composition and moreover, it is impossible to produce an alloy at low cost directly from the materials melted in the crucible furnace.

According to the present invention, metallic materials which compose the alloy are used as electrodes and are melted by an electric arc under comparatively low arc voltage, the melted materials, which have a uniform composition, are contained in the crucible furnace and the alloy in the melted condition is poured into metallic molds or sandmolds for manufacturing alloy castings. In the manufacturing process of an alloy according to the invention, as a substitute for operating with a vacuum condition, a melted layer of slag covers the molten alloy so as to prevent the alloy from contacting the atmosphere. Therefore, oxidization or nitriding of the melted alloy is prevented and gaseous substances which originated from the melted metal are emitted into the atmosphere through the slag, and although the purity of the alloy produced is slightly inferior to that of alloy produced under a vacuum condition, an alloy having an acceptable purity can be manufactured by simple operation and at low cost.

In the drawings of FIGS. 1, 2, 3 and 4 an embodiment for manufacturing an alloy according to the present invention is explained. Before operating the process, small pieces of metallic materials 4, which become components of the alloy, are placed at the bottom of a crucible furnace 1, electrodes 2a and 2b are disposed vertically with respect to the crucible furnace 1 so that their bottom ends contact the small pieces of metallic materials 4. A material 3 for slag is densely filled within the crucible furnace 1 over the layer of the small pieces of metallic materials 4 sourrounding the bottom portions of the electrodes 2a and 2b. The quantity of the material 3 for the slag is so selected that the depth of the slag in a melted condition becomes almost one and a half inches.

When AC current of 40–60 amperes is passed through both the electrodes 2a and 2b, the small pieces of metallic material are heated by electric resistant and start to melt, and then settle on the bottom of the crucible furnace 1. The slag material 3 is also melted by the above-mentioned heat and covers the molten metal 4, and thereby prevents the molten metal 4 from coming in contact with the atmosphere.

Figure 3:
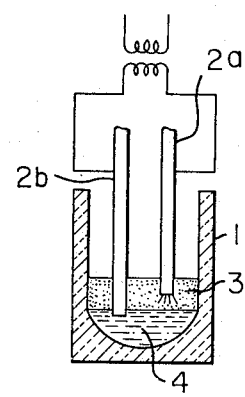

As the quantity of molten metal and slag increase, one of electrodes 2a is raised upward to the position shown in FIG. 3, while the other electrode 2b is kept in its original position, that is, the bottom end of the electrode 2b stays in the molten metal 4 and is continually in contact therewith, and the entire molten metal 4 becomes the electrode 2b. The electrode 2a is insulated from the electrode 2b by the slag 3. Therefore, an electric arc is generated between the bottom end of the electrode 2a and the upper surface of the molten metal 4, and the bottom ends of the electrodes 2a and 2b are melted and consumed. The electrodes 2a and 2b are moved downward in accordance with their melting speed so as to obtain continuous and uniform melting operation 9f the electrodes by controlling the electric condition of the circuit.

The most effective and smooth operation is obtained when the distance between the bottom end of the electrode 2a and the top surface of the molten metal 4 is preferably selected as 20 mm. while the bottom portion of the electrode 2b is inserted into the molten metal 4 a distance from 5 to 10 mm. The distance between the periphery of the two electrodes 2a and 2b is preferably at least 40 mm. The electrode 2a may be disposed vertically at approximately the center of the crucible furnace 1 so as to be positioned farthest from the wall of the furnace 1, thereby, breakage of the furnace is prevented and agitating operation of the molten metal can be carried out smoothly. The melting speed of the electrode 2a is almost twice that of the electrode 2b. Therefore, for example, in case two different kinds of metal are to be melted, the metal whose content is higher in the composition of the alloy to be obtained is used as the electrode 2a, while the other component of lower content is used as the electrode 2b.

Figure 4:
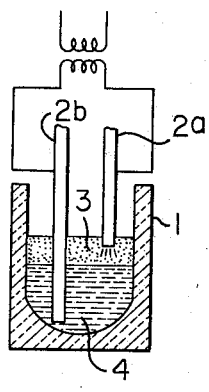

When it is required to increase the melting speed of the electrode 2b, the electrode 2b is inserted sufficiently deep into the molten metal 4, as shown in the drawing of FIG. 4. Since the positions of the electrodes 2a and 2b can be changed easily during the melting operation, the positions of the electrodes 2a and 2b are interchanged so as to control the consumption speed of the electrodes 2a and 2b. When changing the positions of the electrodes 2a and 2b, first the electrode 2b is pulled out from the molten metal 4, to the original position of the electrode 2a, then the electrode 2a is inserted into the molten metal 4 to the original position of the electrode 2b.

The electric current used for this process is 40–60 AC ampere current. Generally, it is preferable to use alternating current. The crucible furnace is made of a non-conductor having refractory properties. Moreover, the material for the crucible furnace should have sufficient resistance against chemical reaction with the molten metal. Generally, alumina- or magnesia-containing materials are suitable for this purpose.

The material of the slag should be chosen in accordance with the chemical properties of the molten metal of the alloy, for example, in case the molten metal is composed mainly of iron, fluorspar is preferable for the purpose and in case the molten metal is composed mainly of copper, a mixture of sodium chloride and caustic lime is mostly used. Generally, the slag should have good electric resistance.

Figure 5:
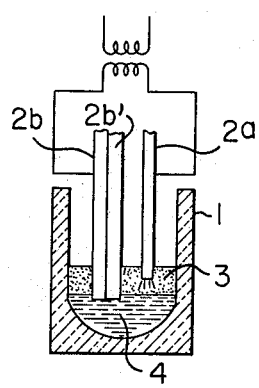
FIGS. 5 and 6 are cross-sectional views showing a modification of the method for manufacturing the alloy shown in FIGS. 1, 2, 3 and 4.

The above-mentioned electrodes are made of metallic materials which are components of the alloy to be produced. The diameter of the electrodes is chosen in accordance with the size of the furnace, but normally, a diameter from 1 to 10 inches is preferable. In case of manufacturing an alloy composed of two components contained in almost the same quantity, two electrodes 2a and 2b can be used as shown in FIG. 1. However, in case the quantity of one component is much larger than that of the other, the larger component material is divided into two electrodes, for example 2a and 2b', and the electrode 2b' is positioned together with the other electrode 2b, as shown in FIG. 5.

In case of manufacturing an alloy composed of multiple components, a, b, c . . . n, the two main components a and b are chosen and made into the electrodes a and b while the minor components are contained in the electrodes 2a or 2b, or are charged separately into the molten metal 4 between the electrode 2a or 2b.

In case of manufacturing an alloy composed of materials having different specific gravities, for example, aluminum and iron and particularly in the case of manufacturing an alloy composed of a large percentage of material having higher specific gravity, both the electrodes 2a and 2b are made from the material having the lower specific gravity, and the material having the higher specific gravity, both the electrodes 2a and 2b are made from the material having the lower specific gravity, and the material having the higher specific gravity is charged into the arcing position under the electrode 2a. In the reverse case, the electrode having the lower specific gravity is inserted into the molten metal by the use of a suitable tool which prevents the molten metal from rising to the surface or charged into the molten metal while the electric source is switched off and after the material has melted, the electricity is switched on again.

Figure 6:
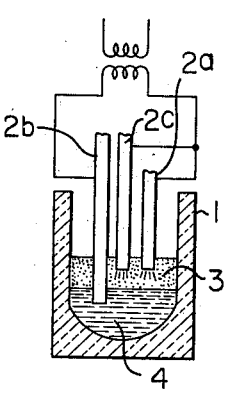

In case materials are used which actively undergo chemical reation in an atmosphere of high temperature, the material which is most stable against the heat of the melting operation should be selected for the electrode. However, in case all materials carry on chemical reaction actively, a covering or coating using materials of slag, etc., can be applied to the surface of the electrode for preventing the above-mentioned chemical reaction. Also, in case additional materials which actively carry on the chemical reaction, are to be added to the molten metal, it is preferable to fill the crucible furnace and cover the molten metal in the crucible furnace with an inert gas. Dependent on the properties of materials for manufacturing the alloy, there are cases in which it is desirable to melt the electrodes by the arc melting system at the same time in order to obtain good bonding of the molecules. In such a case, multiple electrodes can be used as shown in FIG. 6, wherein the two electrodes 2a and 2c are melted as pole 2a by an arc formed between the bottom end of the two electrodes and the surface of the molten metal 4 and the other electrode 2b is inserted into the molten metal 4. It is our experience that the reverse method for arranging a plurality of electrodes does not provide uniform melting of the electrodes. After melting the elecrtodes, the so-called deoxidation operation of the molten metal is carried out and then the deoxidized molten metal is poured into metal molds or sand molds to produce ingot or cast alloy.

In the above-mentioned operation for manufacturing an alloy, the feeding speeds of the electrodes should be controlled so that they are consumed uniformly, and this is necessary because the melting speeds of the electrodes are not the same and the melting speed of the electrodes varies to some extent in accordance with their relative position. Therefore, it is necessary to control the physical relationship between the electrode and the molten metal, so that the alloy obtained will be of uniform composition.

Figure 7:
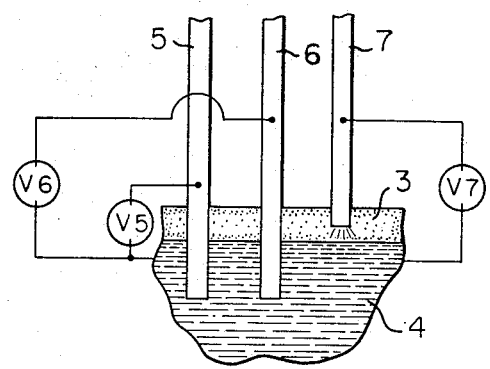
FIGS. 7 and 8 are diagrammatical drawings showing the principle for controlling the condition of an apparatus for carrying out the manufacturing method of the present invention.
Figure 8:
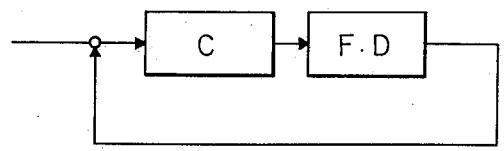

In FIGS. 7 and 8, the automatic feeding method of the electrodes is shown. Electrodes 5 and 6 are disposed vertically with respect to the surface of the molten metal 4 and the bottom portions of the electrodes 5 and 6 are inserted into the molten metal 4, the other electrode 7 is also disposed vertically with respect to the surface of the molten metal 4. The bottom end of the electrode 7 is maintained at a fixed distance from the surface of the molten metal 4, but is positioned in the slag 3. The controlling system for feeding the electrodes, according to the present invention, comprises means for measuring the voltage betwen each electrode and the molten metal, means for automatically calculating the difference between the measured voltages between each electrode and that of molten metal, respectively, and means for controlling the speed of feeding the respective electrode into the crucible furnace. In FIG. 7, voltage measuring devices $V_5$, $V_6$ and $V_7$ measure the respective voltages between the electrode 5 and the molten metal 4, the electrode 6 and the molten metal 4, and the electrode 7 and the molten metal 4, respectively. As shown in FIG. 8, each measured voltage is compared with a desired value and when the value of the above-mentioned difference exceeds the permissible value, a feeding device V of the respective electrode is actuated by a signal from a controller C to start feeding the electrode until the value of the above-mentioned difference comes into the permissible range. The operation of the feeding device is stopped when the value of the difference has come within the permissible range.

As the voltages between the electrodes and the molten metal are continuously measured, the measured voltages after changing the position of the electrodes are also measured and compared with the desired values. Therefore, the end portions of the electrodes are maintained in a suitable position for providing uniform melting condition of the metallic material composing the alloy and this assures production of an alloy of desired, uniform and very accurate composition.

Figure 9:
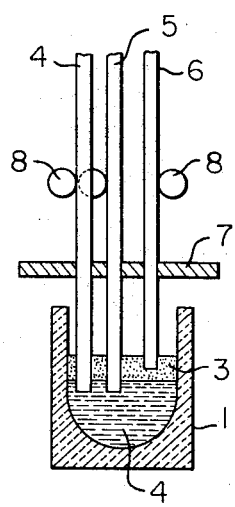
FIG. 9 is a cross-sectional view showing the principal construction of an apparatus for carrying out the manufacturing method of the present invention.
Figure 10:
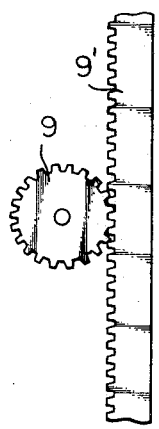
FIGS. 10 and 11 are views of some devices for feeding a component metal into a crucible furnace according to the invention.

In FIGS. 9 and 10, an automatic feeding device used in the method of the present invention is shown. Feeding guides 8 are fixed to a frame of a manufacturing apparatus and a pinion 9 is rotatably supported by a supporting arm (not shown) which meshes with a rack 9' disposed along the longitudinal side of the electrode. In accordance with the variation of the above-mentioned voltage, the control device C actuates motors (not shown) which drive the pinion 9 in the clockwise or counter-clockwise direction on according to the magnitude of the variation of the voltage in excess of the permissible value. And, when the magnitude of the difference between the respective measured voltage and the desired value falls within the permissible value, the control device C stops driving the motor.

Figure 11:
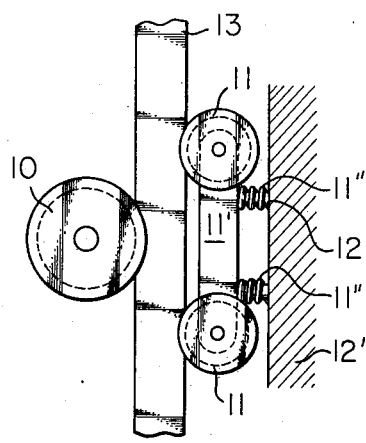

Another embodiment of the method for carrying out the vertical movement of the electrodes is shown in FIG. 11, when a feed roller 10 is supported by a supporting member of the frame (not shown) and contacts the side of the respective electrode 13. The guide rollers 11 are rotatably supported by a frame 11'. A pair of piston-like connections 11" connect the frame 11' with a frame of the manufacturing device 12' and springs 12 supported by the piston-like connections 11" are constantly urging the guide rollers 11 against the electrode 13. In this method, the electrode 13 is fed by a frictional rotation of the guide roller 10 which is driven by the motor (not shown) controlled by the control device C.

In the above-mentioned embodiments, the variation of the voltage between the electrodes and the molten metal is utilized for controlling the feeding of electrodes; however, other characteristics, such as, the variation in the electric current of the electric circuit composed of the molten metal and respective electrode can also be used for controlling the feeding electrodes.

Multiple numbers of electrodes can be used for manufacturing an alloy in accordance with the desired alloy composition. The following table shows some examples of the combination of electrodes.

| Example | Positive electrode | Negative electrode |
|---|---|---|
| 1 | Copper | Iron. |
| 2 | Copper, Nickel, Aluminum | Do. |
| 3 | Copper, Chromium, Nickel | Do. |
| 4 | Copper, Nickel, Titanium | Do. |
| 5 | Copper, Tellurium | Do. |

The alloy manufactured according to the present invention has many superior properties. The following Table 1 shows some mechanical properties of ferro-copper alloys whose components are disclosed in Table 2, which were manufactured according to the method of the present invention. As can be seen from the table, the wear resistance of the alloy manufactured according to the present invention is superior than that of copper. The heat conductivity and electric conductivity are also sufficient for practical use. Therefore, its usefulness as a material for a pantograph for electric trains, tips for a soldering iron, and parts for other mechanical uses was satisfactorily indicated in experimental practice.

TABLE 1

| Type | Shape | Hardness (H.R.B.) | Heat conductivity |
|---|---|---|---|
| Tip No. 1 | Round Rod, 5/32 inch dia. | 75-82 | 0.36-0.52 |
| Tip No. 2 | | 77-90 | 0.32-0.49 |
| Tip No. 3 | | 80-96 | 0.33-0.47 |
| Tip No. 4 | | 70-85 | 0.38-0.48 |
| Tip No. 5 | | 72-85 | 0.36-0.46 |
| Pure copper | | 25-65 | 0.94 |

TABLE 2

| Type | Cu | Fe | Ni | Cr | Al | Ti | Te |
|---|---|---|---|---|---|---|---|
| Tip No. 1 | 50-80 | 50-20 | | | | | |
| Tip No. 2 | 50-70 | 45-40 | 8-2 | | | 2-0.5 | |
| Tip No. 3 | 50-73 | 45-30 | 8-2 | 2-0.5 | | | |
| Tip No. 4 | 50-80 | 50-10 | 8-2 | | | 2-0.5 | |
| Tip No. 5 | 50-80 | 50-20 | | | | | 2-0.5 |

While a preferred embodiment of the invention has been shown in the drawings and described in detail above, it should be understood that various modifications may be had which would be equally effective within the spirit and scope of the invention, and that the true measure of the invention is as defined in the hereafter set forth claims.

What is claimed is:

1. A method for manufacturing alloy comprising, charging metallic materials to become components of an alloy, in a layer like condition within a non-electrically conducting crucible furnace; covering said layer of said metallic materials with materials for forming slag; melting said metallic materials and said material for forming slag by supplying electric current to said metallic materials through at least two consumable electrodes contacting said metallic materials, thereby forming a layer of molten metal at a bottom of said crucible furnace and a layer of slag over said layer of molten metal; placing at least one of said consumable electrodes in said layer of slag and one of the remaining consumable electrodes in said layer of molten metal; melting down all of said consumable electrodes into said layer of molten metal by supplying electric current to a circuit which comprises said consumable electrodes, said layer of slag and said layer of molten metal, said layer of slag serving both to prevent oxidation of said molten metal and to conduct heat from said current thereto; and controlling the distance between the bottom ends of said consumable electrodes, which are positioned in said layer of slag, and the level of said layer of molten metal by comparing with a desired value a value of a measured electrical characteristic which depends on said distance.

2. A method for manufacturing alloy according to claim 1, wherein said metallic material and said consumable electrodes are composed of at least one member selected from the group consisting of iron, copper, nickel, chromium, aluminium, titanium and tellurium.

3. A method for manufacturing alloy according to claim 1, wherein said electrical characteristic is the electric voltage between said bottom end of said consumable electrode positioning in said layer of slag and said top surface of said layer of molten metal.

4. A method for manufacturing alloy according to claim 1, wherein said electrical characteristic is the amperes of electric current flowing through said respective consumable electrode.

5. A method as in claim 1, wherein said electric current is alternating current.

References Cited

UNITED STATES PATENTS 3,224,868  12/1965  Philbrick _____ 75—12
3,273,212  9/1966  Garmy _____ 75—12 X

FOREIGN PATENTS 270,553  5/1927  Great Britain.

L. DEWAYNE RUTLEDGE, Primary Examiner

J. E. LEGRU, Assistant Examiner

U.S. Cl. X.R.

75—125